(12) United States Patent
Yousaf et al.

(10) Patent No.: US 11,507,739 B2
(45) Date of Patent: Nov. 22, 2022

(54) SYSTEMS AND METHODS FOR COLLABORATIVE DATA ENTRY AND INTEGRATION

(71) Applicant: Palantir Technologies Inc., Palo Alto, CA (US)

(72) Inventors: Timothy Yousaf, New York, NY (US); Jeffrey Martin, New York, NY (US); Jasmine Peterson, Mountain View, CA (US); Julie Tibshirani, Palo Alto, CA (US); Kevin Ng, New York, NY (US); Rhys Brett-Bowen, London (GB); Yichen Xing, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 17/385,844

(22) Filed: Jul. 26, 2021

(65) Prior Publication Data

US 2021/0357581 A1    Nov. 18, 2021

Related U.S. Application Data

(63) Continuation of application No. 15/901,736, filed on Feb. 21, 2018, now Pat. No. 11,087,080.
(Continued)

(51) Int. Cl.
*G06F 17/00* (2019.01)
*G06F 40/18* (2020.01)
*G06F 3/0486* (2013.01)

(52) U.S. Cl.
CPC ............ *G06F 40/18* (2020.01); *G06F 3/0486* (2013.01)

(58) Field of Classification Search
CPC ............................. G06F 40/18; G06F 3/0486
(Continued)

(56) References Cited

U.S. PATENT DOCUMENTS 7,013,312 B2   3/2006   Bala et al.
7,174,504 B2   2/2007   Tsao
(Continued)

FOREIGN PATENT DOCUMENTS

EP       2284769 B1    1/2013

OTHER PUBLICATIONS

Jones, 'Graphical Query Specification and Dynamic Result Previews for a Digital Library', USIT, 1998 (Year: 1998).*
(Continued)

*Primary Examiner* — Stephen S Hong
*Assistant Examiner* — Matthew J Ludwig
(74) *Attorney, Agent, or Firm* — Sheppard Mullin Richter & Hampton LLP

(57) ABSTRACT

A system and a method are provided for collaborative data entry and integration. An operation performed by the system and the method include causing a collaborative interface for input to a spreadsheet to be provided via a user interface, receiving a data entry to the spreadsheet via the collaborative interface, validating the received data entry based on one or more validity rules associated with the spreadsheet, capturing a snapshot of the spreadsheet including the validated data entry, and causing at least the validated data entry of the spreadsheet to be integrated into datasets for one or more applications, at least based on the captured snapshot of the spreadsheet.

20 Claims, 6 Drawing Sheets

Related U.S. Application Data

(60) Provisional application No. 62/595,418, filed on Dec. 6, 2017.

(58) Field of Classification Search
USPC .................................................. 715/212, 220
See application file for complete search history.

(56) References Cited

U.S. PATENT DOCUMENTS

| | | | |
|---|---|---|---|
| 7,225,189 | B1 | 5/2007 | McCormack et al. |
| 7,506,243 | B2 | 3/2009 | Kotler |
| 7,546,286 | B2 | 6/2009 | Dickinson |
| 7,966,426 | B2 | 6/2011 | Smith |
| 8,108,779 | B1 | 1/2012 | Rein et al. |
| 8,140,958 | B2 | 3/2012 | Garrett |
| 8,676,937 | B2 | 3/2014 | Rapaport |
| 8,892,679 | B1 | 11/2014 | Destagnol |
| 9,720,747 | B2 | 8/2017 | Thomas |
| 10,068,031 | B2 | 9/2018 | Moore |
| 10,885,021 | B1 * | 1/2021 | Llorca ................ G06F 9/45512 |
| 2007/0178501 | A1 | 8/2007 | Rabinowitz et al. |
| 2007/0286099 | A1 | 12/2007 | Stocklein et al. |
| 2009/0260060 | A1 | 10/2009 | Smith |
| 2011/0185305 | A1 | 7/2011 | Lai et al. |
| 2011/0288660 | A1 | 11/2011 | Wojsznis et al. |
| 2012/0260152 | A1 | 10/2012 | Shimizu |
| 2014/0324501 | A1 * | 10/2014 | Davidow ........ G06Q 10/063118 705/7.17 |
| 2014/0357268 | A1 * | 12/2014 | Dubey ................ H04W 48/16 455/434 |
| 2015/0080128 | A1 | 3/2015 | Terrell, IV |
| 2016/0173594 | A1 | 6/2016 | Nelson et al. |
| 2016/0292206 | A1 * | 10/2016 | Ruiz Velazquez .... G06F 16/258 |
| 2017/0357628 | A1 * | 12/2017 | Hurley ................ G06F 40/174 |
| 2018/0046608 | A1 * | 2/2018 | Yousaf ................ G06F 40/174 |
| 2018/0143975 | A1 | 5/2018 | Casal |
| 2019/0187962 | A1 * | 6/2019 | Stachura ................ G06F 8/38 |

OTHER PUBLICATIONS

Official Communication for U.S. Appl. No. 15/258,918 dated Aug. 10, 2017.

Official Communication for U.S. Appl. No. 15/258,918 dated Dec. 21, 2017.

Official Communication for U.S. Appl. No. 15/258,918 dated May 30, 2017.

* cited by examiner

SYSTEMS AND METHODS FOR COLLABORATIVE DATA ENTRY AND INTEGRATION

CROSS REFERENCE TO RELATED APPLICATIONS

This application is a continuation of U.S. patent application Ser. No. 15/901,736, filed Feb. 21, 2018, which claims the benefit under 35 U.S.C. § 119(e) of U.S. Provisional Application Ser. No. 62/595,418, filed Dec. 6, 2017, the contents of which are incorporated by reference in its entirety into the present disclosure.

FIELD OF THE INVENTION

This disclosure relates to approaches for collaborative data entry to a spreadsheet and integration of data entry in a spreadsheet application to another application.

BACKGROUND

Entering and editing data stored in a system may be difficult. For example, systems may contain various structured input forms that require data to be entered in a specific way, or the interdependency on the data by multiple applications may cause one or more access controls associated with the data to render it inaccessible to most users. Under conventional approaches, traditional spreadsheet applications may be employed as convenient tools for ad-hoc data-entry. However, such traditional spreadsheet applications may not be conducive for use in collaborative environments. For example, with traditional spreadsheet tools it is difficult for multiple users to collaborate on a single spreadsheet because if one user has the spreadsheet open, other users will be unable to open it. Additionally, data entered or edited using traditional spreadsheet tools or other conventional solutions may be difficult to integrate into data sources or applications of different types. For example, a single dataset may be difficult to seamlessly integrate into both a relational database and an object-oriented database. These and other drawbacks exist with conventional solutions.

SUMMARY

Various embodiments of the present disclosure can include systems, methods, and non-transitory computer readable media. In some embodiments, a system includes one or more processors, and a memory storing instructions that, when executed by the one or more processors, cause the system to perform operations. In some embodiments, a method includes the operations. In some embodiments, a non-transitory computer readable medium includes instructions to perform the operations. The operations include causing a collaborative interface for input to a spreadsheet to be provided via a user interface, receiving a data entry to the spreadsheet via the collaborative interface, validating the received data entry based on one or more validity rules associated with the spreadsheet, capturing a snapshot of the spreadsheet including the validated data entry, and causing at least the validated data entry of the spreadsheet to be integrated into datasets for one or more applications, at least based on the captured snapshot of the spreadsheet.

In some embodiments, the data entry involves a copy and paste operation to copy datasets from a spreadsheet region of a second spreadsheet generated by a second spreadsheet application and paste the copied datasets to a spreadsheet region of the spreadsheet. In some embodiments, the data entry involves a drag and drop operation to drag a representation of an external content from a user interface and drop the representation at a position of the spreadsheet corresponding to a cell of the spreadsheet. In some embodiments, upon validation of the received data entry involving the drag and drop operation, the instructions further cause the system to present a link to the external content at the position of the spreadsheet corresponding to the cell. In some embodiments, upon validation of the received data entry involving the drag and drop operation, the instructions further cause the system to present an representative image of the external content at the position of the spreadsheet corresponding to the cell.

In some embodiments, the instructions further cause the system to generate a log of modification to the spreadsheet upon reception of the data entry, and cause the generated log to be also integrated with the datasets for the one or more applications.

In some embodiments, said at least the validated data entry of the spreadsheet is caused to be integrated into the datasets for the one or more applications upon refresh of at least one of the one or more applications. In some embodiments, said at least the validated data entry of the spreadsheet is caused to be integrated into the datasets for the one or more applications upon capturing of the snapshot. In some embodiments, wherein said at least the validated data entry of the spreadsheet is caused to be integrated into the datasets for the one or more applications upon user input to start integration.

In some embodiments, the instructions further cause the system to generate a spreadsheet template based on the spreadsheet and one or more validity rules associated therewith, and generate a script to generate the spreadsheet template based on schema describing the spreadsheet template and the one or more validity rules.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Various embodiments of the present disclosure may include systems, methods, and non-transitory computer readable media configured to enable collaborative data entry and integrate the data across various applications and data sources. Using spreadsheets, datasets included in one or more data sources and/or utilized by one or more applications may be edited collaboratively. Based on one or more integration rules associated with the one or more data sources and/or applications, data entries entered or edited into a spreadsheet may be integrated into the one or more data sources and/or applications. In some implementations, each spreadsheet and/or each type of operation capable of being performed in each spreadsheet may be associated with one or more access controls that restrict access to, modification of, and/or integration of the data entries of the spreadsheet based one or more defined security permissions. In some embodiments, content items may be inserted into corresponding cells of one or more data entries of a spreadsheet and integrated into one or more data sources and/or applications. For example, users can drag-and-drop files (or content items) into cells. In some embodiments, rules may be applied to cells of a spreadsheet to validate data entered into those cells. In some embodiments, spreadsheets may be associated with sheet-level permissions. For example, users can be provided with permissions to open certain spreadsheets, change cells, input data, and modify columns, to name some examples. In some embodiments, a sheet history can be maintained for sheets. For example, sheet snapshots may be captured periodically or at every change to the sheet. In such embodiments, users can revert back to previous versions of sheets. Through the use of the spreadsheets and integration rules described herein, the data of a system may be both collaboratively edited and seamlessly integrated across multiple data sources and applications.

Figure 1:
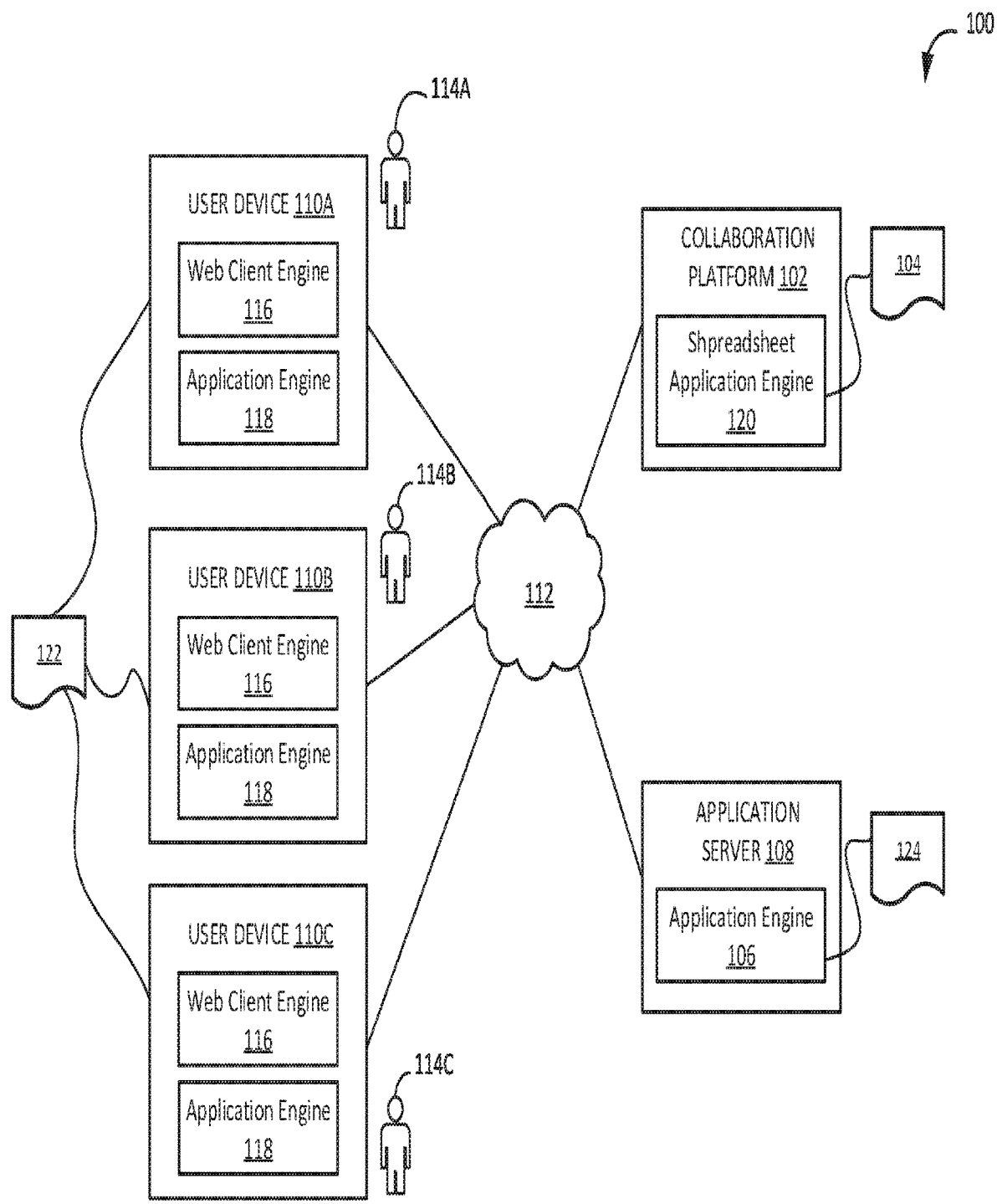
FIG. 1 is a network diagram illustrating an example of a network system according to some embodiments.

FIG. 1 is a network diagram illustrating an example of a network system 100 according to some embodiments. In the example of FIG. 1, the network system 100 includes a collaboration platform 102 including a spreadsheet application engine 120, an application server 108 including a network-based application engine 106, and user devices 110A-C (hereinafter collectively referred to as user device 110), all communicatively coupled to each other via a network 112. In some embodiments, the collaboration platform 102 is configured to integrate spreadsheet data 104 with a network-based application run by the network-based application engine 106. As shown, the collaboration platform 102 shown in FIG. 1 employs a client-server architecture to exchange data with the user devices 110A-C, although the present inventive subject matter is, of course, not limited to such an architecture, and could equally well find application in an event-driven, distributed, or peer-to-peer architecture system, for example. Moreover, it shall be appreciated that although some of the functional components of the network system 100 are discussed in the singular sense, multiple instances of one or more of the various functional components may be employed.

In some embodiments, users 114A-C shown in FIG. 1 may be human users (e.g., human beings), machine users (e.g., computers configured by a software program to interact with the device 110), or any suitable combination thereof (e.g., a human assisted by a machine or a machine supervised by a human). The users 114A-C are respectively associated with the user devices 110A-C and may be users of such devices.

In some embodiments, the user devices 110A-C is any one of a desktop computer, a tablet computer, a smart phone, or a wearable device (e.g., a smart watch or smart glasses) belonging to any one of the users 114A-C. In some embodiments, the user devices 110A-C include one or more of a web client engine 116 (e.g., a web browser engine) and an application engine 118 configured to run an application to facilitate communication and interaction between the user device 110 and the collaboration platform 102. In various embodiments, information communicated between the collaboration platform 102 and the user device 110 include user-selected functions available through one or more user interfaces (UIs). Accordingly, during a communication session with any one of the user devices 110A-C, the collaboration platform 102 may provide a set of machine-readable instructions that, when interpreted by the user devices 110A-C using the web client engine 116 or the application engine 118, cause the user devices 110A-C to present the UI, and transmit user input received through such a UI back to the collaboration platform 102.

In some embodiments, the collaboration platform 102 is implemented in a special-purpose (e.g., specialized) computer system, in whole or in part, as described below. In some embodiments, the collaboration platform 102 includes the spreadsheet application engine 120 designed for continual collection of human-created data. More specifically, the spreadsheet application engine 120 includes a front end that allows the users 114A-C to interact with a spreadsheet 122 using either the web client engine 116 or the application engine 118, and a backend that drives a view of the spreadsheet 122 and maintains a canonical version of the spreadsheet data 104 that is created. In this example, the spreadsheet 122 is a live representation of the spreadsheet data 104 maintained by the spreadsheet application engine 120. The spreadsheet data 104 is stored in a datastore (e.g., a computer-readable storage device) that forms part of, or is communicatively coupled to, the collaboration platform 102. In some embodiments, the collaboration platform 102 may further maintain one or more historical versions of the spreadsheet data 104 to enable the users 114A-C to restore the spreadsheet 122 to a prior version.

In some embodiments, the spreadsheet application engine 120 also allows the users 114A-C to create validation rules associated with the spreadsheet 122. Each validation rule includes a constraint that limits or controls what the users 114 can enter into at least one cell of the spreadsheets 122, and each is typically, but not necessarily always, associated with entire columns in the spreadsheet 122.

In some embodiments, the spreadsheet application engine 120 is also responsible for synchronizing the spreadsheet data 104 with application data 124 consumed (e.g., used) by the application engine 106 of the application server 108 for running an expansive application, such as database application, database analysis application, and database visualization application. In some embodiments, the application engine 106 causes the application server 108 to provide an applicable number of network-based services that consume application data 124 to provide data manipulation, presentation, communication, or other capabilities to the users 114A-C or other users. For example, the network-based services include a database service of managing datasets and providing analysis of the datasets (e.g., relationships among the datasets, a visual presentation of relationships among the datasets such as graph, map, etc.).

In some embodiments, a dataset can contain any applicable contents and be in an any applicable format. For example, the dataset is a text file in a format such as HTML, PDF, Microsoft Office, etc., an image fil in a format such as JPEG, GIF, TIFF, etc., an audio file in a format such as MP3, WAV, WMA, etc., a video file in a format such as AVI, MPEG, MP4, etc., a compressed file in a format such as ZIP, an object file in a format such as exe, and so on. A dataset is, for example, generated by an external application running on a computer system(s) and/or on the user device(s) 110.

In some embodiments, the network 112 may be any applicable network that enables communication between or among systems, machines, databases, and devices (e.g., between collaboration platform 102 and the devices 110A-C). For example, the network 112 is a wired network, a wireless network (e.g., a mobile or cellular network), or any suitable combination thereof. The network 112 may include one or more portions that constitute a private network, a public network (e.g., the Internet), or any suitable combination thereof. Accordingly, the network 112 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMAX network), or any suitable combination thereof. Any one or more portions of the network 112 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In some embodiments, database described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The databases may comprise one or more such databases that reside in one or more physical devices and in one or more physical locations. The database may store a plurality of types of data and/or files and associated data or file descriptions, administrative information, or any other data.

Figure 2:
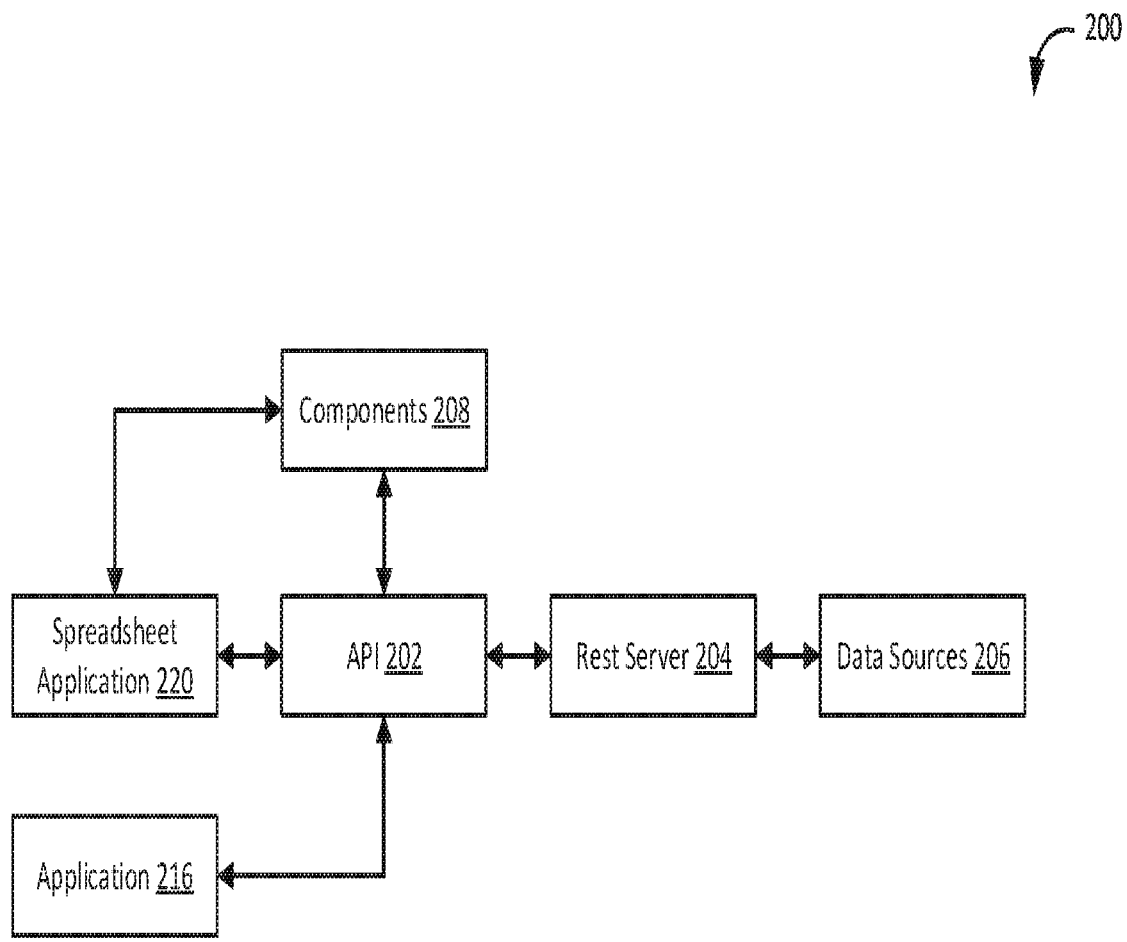
FIG. 2 is an architecture diagram illustrating a structure of a network system according to some embodiments.

FIG. 2 is an architecture diagram illustrating a structure of a network system 200 according to some embodiments. In the network system 200 shown in FIG. 2, a spreadsheet application engine 220 and an application engine 216 interact via an application programming interface (API) 202, with a representational state transfer (REST) server 204 to synchronize spreadsheet data (e.g., the spreadsheet data 104 in FIG. 1) with application data (e.g., the application data 124 in FIG. 1) consumed by the application engine 216. That is, in some embodiments, the spreadsheet application engine 220 and the application engine 216 correspond to the spreadsheet application engine 120 and the application engine 106 in FIG. 1, respectively. For example, the spreadsheet application engine 220 may communicate, via the API 202, with the REST server 204 to integrate the spreadsheet data with data sources 206 that include one or more data repositories (e.g., databases) that provide data to the application engine 216. Likewise, the application engine 216 may communicate, via the API 202, with the REST server 204 to integrate changes to the application data with the data sources 206, which may, in turn, be consumed by the spreadsheet application engine 220. Additionally, a collaboration platform (e.g., the collaboration platform 102 in FIG. 1) and the application engine 216 are in communication with one or more components 208 that provide additional functionality to the collaboration platform and the application engine 216 related to data included in the data sources 206. For example, the one or more components 208 may provide a data object viewer, a document viewer, search templates, ontology chooser, or an investigation bar to users (e.g., the users 114A-C) of either the spreadsheet application engine 220 or the application engine 216.

Figure 3:
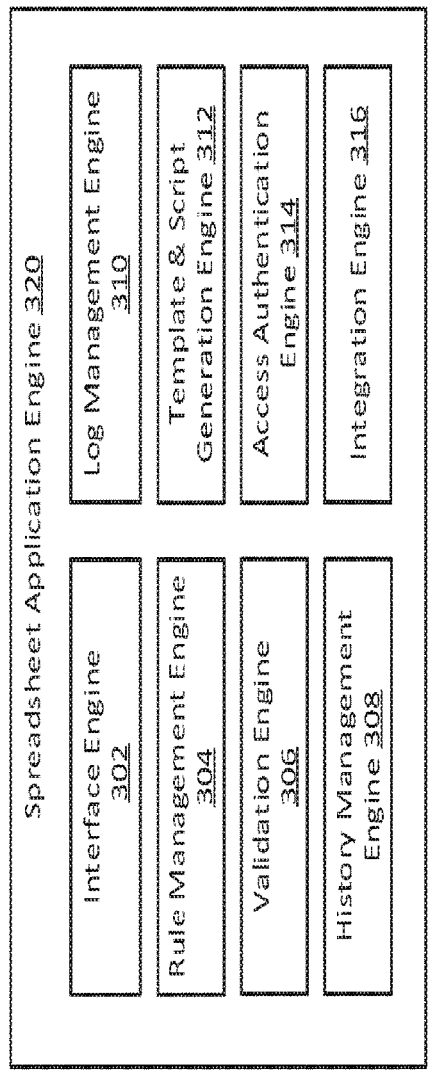
FIG. 3 is a block diagram illustrating a configuration of a spreadsheet application including various functional components according to some embodiments.

FIG. 3 is a block diagram illustrating a configuration of a spreadsheet application including various functional components according to some embodiments. To avoid obscuring the subject matter with unnecessary detail, various functional components (e.g., modules, engines, and databases) that are not germane to conveying an understanding of the inventive subject matter have been omitted from FIG. 3. However, a skilled artisan will readily recognize that various additional functional components may be supported by the spreadsheet application to facilitate additional functionality that is not specifically described herein. In the example shown in FIG. 3, a spreadsheet application engine 320 includes an interface engine 302; a rule management engine 304, a validation engine 306, a history management 308, a log management engine 310, a template & script generation engine 312, an access authentication engine 314, and an integration engine 316. Each of the above referenced functional components of the spreadsheet application engine 320 are configured to communicate with each other (e.g., via a bus, shared memory, a switch, or application programming interfaces (APIs) (e.g., API 202 in FIG. 2). In some embodiments, the spreadsheet application engine 320 corresponds to the spreadsheet application engine 120 in FIG. 1.

In the example of the spreadsheet application engine 320 shown in FIG. 3, the interface engine 302 is intended to represent a computing system configured to receive user inputs (e.g., requests) from user devices (e.g., the user devices 110A-C in FIG. 1), and communicate appropriate responses to the user devices. In some embodiments, the interface engine 302 receives requests from devices in the form of hypertext transfer protocol (HTTP) requests or other web-based, API requests. For example, the interface engine 302 is configured to provide a number of interfaces (e.g., APIs 202) that allow data to be exchanged between the user devices and a collaboration platform (the collaboration platform 102 in FIG. 1).

In some embodiments, the interface engine 302 is also configured to provide collaborative UIs to the user devices 110A-C that allow users (e.g., the users 114A-C in FIG. 1) to view and interact with a spreadsheet (e.g., the spreadsheet 122 in FIG. 1). To provide a collaborative UI to one or more user devices, the interface engine 302 is configured to transmit a set of machine-readable instructions to the user device(s) that causes the user device(s) to present the collaborative UI on a display of the user device(s). The set of machine-readable instructions may, for example, include presentation data (e.g., representing various elements of the collaborative UI), spreadsheet data (the spreadsheet data 104 in FIG. 1), and a set of instructions to display the presentation data. The receiving device (e.g., one of the user devices 110A-C in FIG. 1) may temporarily store the presentation data and the spreadsheet data to enable display of the collaborative UI and interaction with the spreadsheet from within the collaborative UI.

The collaborative UIs provided by the interface engine 302 may also include various input control elements (e.g., sliders, buttons, drop-down menus, checkboxes, and data entry fields) that allow the users to specify various inputs such as updates to cells of a spreadsheet or validation rules associated with the spreadsheet. The interface engine 302 is configured to receive and process user input received through such input control elements, and in some instances, the interface engine 302 is configured to update the spreadsheet data in accordance with the received input (e.g., the interface engine 302 updates the spreadsheet data in accordance with edits made to the spreadsheet by one of the users). Specific examples of collaborative UIs and other details for data entry are described in U.S. application Ser. No. 15/258,918 filed on Sep. 7, 2016, the entire content of which are incorporated herein by reference.

In some embodiments, the collaborative UIs and/or a synchronized spreadsheet (e.g., the spreadsheet 122 in FIG. 1) is simultaneously provided to multiple user devices, and the interface engine 302 is configured to receive user inputs from multiple user devices and reflect the user inputs from the multiple user devices on the synchronized spreadsheet. For example, the interface engine 302 enables a link (e.g., URL) to the synchronized spreadsheet to be available to a user, and multiple users accessing the link can manipulate the synchronized spreadsheet simultaneously through a web browser. When a user is manipulating a cell of the synchronized spreadsheet, for example, the interface engine 302 is configured to present an indication that the cell is manipulated by the user, on one or more spreadsheets presented to other users.

In some embodiments, the user inputs include various applicable inputs. For example, a direct input (by text, selection, etc.) into a cell of a spreadsheet managed by the spreadsheet application engine 320, a copy and paste from a spreadsheet region (one or more columns and one or more rows) of a spreadsheet of an external application (e.g., Microsoft Excel) to a spreadsheet region of the spreadsheet managed by the spreadsheet application engine 320, and a drag and drop of an external content (e.g., a file, a spreadsheet region, etc.) into positions corresponding to one or more cells (e.g., in the cells) of the spreadsheet managed by the spreadsheet application engine 320. In a more specific implementation, when a file (e.g., an image file) is dragged and dropped to a position corresponding to a cell of the spreadsheet managed by the spreadsheet application engine 320, the interface engine 302 is configured to cause a link to the file and/or a representative image (e.g., a thumbnail) of the file to be presented in the cell, depending on a specific format setting of the cell, the column of the cell, and/or the row of the cell. In this case, contents of the file may be downloaded to and stored in a backend repository of the spreadsheet application engine 320.

In the example of the spreadsheet application engine 320 shown in FIG. 3, the rule management engine 304 is intended to represent a computing system configured to manage validation rules associated with a spreadsheet managed by the spreadsheet application engine 320. In some embodiments, the validation rules include a constraint on data entered into at least one cell of the spreadsheet, and in many cases, on all cells of an entire column and/or row. For example, a validation rule may constrain data entered into a column specifically to an applicable parameter format such as dates, geographical location coordinates, and so on. When a validation rule constrains data entry to dates, any non-date entry entered into a cell of the spreadsheet will not conform to the validation rule.

In some embodiments, the rule management engine 304 is configured to allow the users to add, edit, or delete validation rules associated with the spreadsheet. To this end, the rule management engine 304 is configured to work in conjunction with the interface engine 302 to provide a rule management interface that allows users to view, add, edit, or delete validation rules. Further, the rule management engine 304 is configured to store validation rules as part of a spreadsheet artifact, which corresponds to spreadsheet data (e.g., the spreadsheet data 104 in FIG. 1).

In the example of the spreadsheet application engine 320 shown in FIG. 3, the validation engine 306 is intended to represent a computing system configured to validate data in cells of a spreadsheet according to one or more validation rules associated with the spreadsheet. In validating data in the cells of the spreadsheet, the validation engine 306 is configured to compare information entered into each of the cells with any validation rules associated with the cell to determine whether the information entered into the cell conforms to the associated validation rules. In an example, validation rule(s) associated with the spreadsheet specifies that only dates should be entered into a particular column. In this example, the validation engine 306 is configured to check whether the information entered into each cell of the column is a date.

Cells with entries that conform to the validation rules are considered to include valid entries, whereas cells with entries that do not conform to the validation rules are considered to include invalid entries. In response to determining that a cell includes an invalid entry, the validation engine 306 is configured to work in conjunction with the interface engine 302 to cause the cell with the invalid entry to be visually distinguished from cells with valid entries. For example, the cell with the invalid entry may be highlighted or otherwise displayed differently (e.g., in a different color, font, format, or style) from entries in the spreadsheet that include valid entries.

In the example of the spreadsheet application engine 320 shown in FIG. 3, the history management engine 308 is intended to represent a computing system configured to store and manage snapshots of a spreadsheet managed by the spreadsheet application engine 320. In some embodiments, the history management engine 308 is configured to capture a snapshot of a spreadsheet at applicable timings. For example, the history management engine 308 is configured to capture the snapshot at every change of the spreadsheet. In another example, the history management engine 308 is configured to capture the snapshot periodically every predetermined time period (e.g., several ten seconds). When the history management engine 308 captures the snapshot periodically, the interval of storing snapshots may become longer as the captured time becomes older, such as one day over a past week, one week for a past month, and one month over a past year. In this case, the history management engine 308 may discard some of captured snapshots that do not meet the criteria to maintain snapshots. In some embodiments, a snapshot includes spreadsheet data (e.g., the spreadsheet data 104 in FIG. 1) corresponding to a spreadsheet (e.g., the spreadsheet 122 in FIG. 1) managed by the spreadsheet application engine 320 at the time of capturing the snapshot. Depending on a specific implementation of embodiments, the snapshot may or may not include logs of changes to the spreadsheet that have been made up to the time.

In some embodiments, the history management engine 308 is also configured to generate a snapshot table based on snapshots that have been captured, such that an application engine (e.g., the application engine 106 in FIG. 1) for an expansive application can consume data of the snapshots. When the history management engine 308 generates a snapshot table, the history management engine 308 may be further configured to work in conjunction with the interface engine 302 to provide a table management interface that allows users to view, add, edit, or delete the snapshot table. Further, the history management engine 308 may be configured to work in conjunction with the interface engine 302 to provide a visual presentation of a snapshot that allows users to view the snapshot.

In the example of the spreadsheet application engine 320 shown in FIG. 3, the log management engine 310 is intended to represent a computing system configured to generate and maintain a log with regard to changes made to a spreadsheet managed by the spreadsheet application engine 320, such that an application engine (e.g., the application engine 106 in FIG. 1) for an expansive application can consume data of the logs. In some embodiments, the log management engine 310 is configured to generate a log of changes at every change of the spreadsheet. In some embodiments, a log includes one or more of an identifier (e.g., user name, user ID, etc.) of a user who made a change, content of the change, a cell at which the change was made, a time and date of the change. When data in a spreadsheet is evaluated (or analyzed), piece of data that have been edited by users (e.g., human users) are more likely to be valuable as opposed to machine entered data or large quantities of data. By maintaining logs of changes made to a spreadsheet, the log management engine 310 is capable of providing valuable information to analyze data in the spreadsheet when spreadsheet data is integrated with application data (e.g., the application data 124 in FIG. 1) of an expansive application.

In the example of the spreadsheet application engine 320 shown in FIG. 3, the template & script generation engine 312 is intended to represent a computing system configured to generate an editable template from a spreadsheet region of a spreadsheet managed by the spreadsheet application engine 320, and also generate an editable script of the generated template. In some embodiments, in generating an editable template, the template & script generation engine 312 is configured to allow a user to create a new spreadsheet, add description to a template to be generated from the new spreadsheet, create column names, set validation rules to columns, and select an option to create a new template. Then, the template & script generation engine 312 is configured to obtain database schema of the new spreadsheet (a spreadsheet region thereof) from which the template is to be generated, and generate the template by transforming the obtained database schema. Once an editable template is generated, one or more users can choose the editable template and quickly enter data into the editable template to create a new spreadsheet.

In some embodiments, the template & script generation engine 312 is configured to enable the new spreadsheet created from an editable template to be automatically integrated with application data (e.g., the application data 124 in FIG. 1) of an expansive application, depending on a specific setting for auto-integration that can be made through an integration interface generated by the template & script generation engine 312 working in conjunction with the interface engine 302.

In some embodiments, in generating a script of a generated editable template, the template & script generation engine 312 is configured to generate a selectable object representing the generated editable template by working in conjunction with the interface engine 302. Upon selection of the selectable object representing the generated editable template, the template & script generation engine 312 generates an auto-generated type-safe script of the generated editable template, in which applicable object fields, such as object type and property mapping, can be edited. When the script of the generated editable template completes edits, the template & script generation engine 312 is configured to update the generated editable template based on edits made on the script.

In the example of the spreadsheet application engine 320 shown in FIG. 3, the access authentication engine 314 is intended to represent a computing system configured to manage access authentication for users to access (and further edit and save) a spreadsheet managed by the spreadsheet application engine 320. In some embodiments, the access authentication engine 314 is configured to selectively allow authenticated user(s) to access (e.g., view) the spreadsheet, and further selectively allow authenticated user(s), which are different from the accessible users, to edit the spreadsheet. Depending on a specific implementation of embodiments, the access authentication engine 314 may limit edits to a spreadsheet, with respect to one or more specific cells of the spreadsheet, one or more specific columns and/or rows of the spreadsheet, more specific titles of one or more columns and/or rows of the spreadsheets.

In the example of the spreadsheet application engine 320 shown in FIG. 3, the integration engine 316 is intended to represent a computing system configured to integrate spreadsheet data of a spreadsheet managed by the spreadsheet application engine 320 with application data (e.g., the application data 124 in FIG. 1) of an expansive application. That is, the integration engine 316 is responsible for ensuring that changes made to the spreadsheet data are reflected in the application data, and that changes made to the application data are reflected in the spreadsheet data. In integrating the spreadsheet data with the application data, the integration engine 316 is configured to communicate, via an API (e.g., the API 202 in FIG. 2), one or more requests to a server (e.g., the REST server 204 in FIG. 2) to integrate the spreadsheet data and any subsequent changes made thereto with data sources (e.g., the data sources 208 in FIG. 2) that supply the application data to the expansive application.

In many instances, the expansive application employs a particular application data schema that includes a set of constraints on the application data. For example, the application data schema for a map application may specify that the application data be in the form of geo-coordinates (e.g., latitude and longitude, or military grid reference system (MGRS)). In these instances, the integration engine 316 is configured to ensure that the validation rules associated with the spreadsheet match the application data schema for the expansive application prior to integrating the spreadsheet data with the application data. In other words, the integration engine 316 is configured to compare the validation rules associated with the spreadsheet to the application data schema to determine whether the validation rules include the set of constraints that are included in the application data schema. In this way, the integration engine ensures that the expansive application is not provided with invalid values that may lead to errors or other issues. In some embodiments, the integration engine 316 is configured to selectively integrate data of valid cells with the application data, without integrating data of invalid cells.

In some embodiments, the integration engine 316 is configured to work in conjunction with the interface engine 302 to generate an export interface to integrate spreadsheet data of a spreadsheet with application data of an expansive application. Depending on a specific implementation of the embodiments, the export interface may include one or more selectable object to select an expansive application with which the spreadsheet data is integrated. When an expansive application is selected through the export interface, the integration engine 316 exports the most recent snapshot generated by the history management engine 308 and/or the logs generated by the log management engine 310 to the database application, and an application engine (e.g., the application engine 106 in FIG. 1) executing the expansive application perform application operations according to the snapshot and/or the logs. For example, when the expansive application is a database application, the application engine generates a database sheet corresponding to the spreadsheet based on the snapshot and/or the logs. In another example, when the expansive application is a database analysis application, the application engine performs analysis of relationships among data in the cells of the spreadsheets based on the snapshot and/or the logs. In still another example, when the expansive application is a database visualization application, the application engine generates a visual presentation of datasets (e.g., a geographical location map, a correlation diagram, etc.) in cells of the spreadsheet.

In some embodiments, when a link or a representation image of external content is presented in a cell of the spreadsheet and the external content is stored in a backend of the spreadsheet application engine 320, the integration engine 316 is configured to also integrate the external content stored in the backend with the application data of the expansive application. Depending on a specific configuration of the expansive application, the link or the representation image may not be compatible with the expansive application. In such a case, the expansive application may instead use the external content for processing therein.

In some embodiments, the integration engine 316 is configured to automatically and/or manually integrate spreadsheet data of a spreadsheet managed by the spreadsheet application engine 320 with application data of an expansive application, depending on a specific integration setting. When the integration engine 316 is set to automatically perform integration, the integration engine 316 may be configured to perform integration at applicable timing, such as every change to the spreadsheet and/or every predetermined period of time. When the integration engine 316 is set to manually perform integration, the integration engine 316 may be configured to perform integration upon user input to perform integration. In some embodiments, the integration engine 316 is configured to disable automatic integration when a size of the spreadsheet (e.g., the number of rows) is larger than a threshold. In this case, a schema to import to the spreadsheet of the large size may need to be set in the expansive application.

In some embodiments, the integration engine 316 is configured to enable an expansive application to autonomously import spreadsheet data of a spreadsheet managed by the spreadsheet application engine 320. For example, when the integration engine 316 receives a request to export spreadsheet data of a spreadsheet from an expansive application, the integration engine 316 is configured to export the spreadsheet data of the spreadsheet to the expansive application that sent the request, such that that the expansive application can import and consume the spreadsheet data for integration. Similarly, in some embodiments, the integration engine 316 is configured to enable an expansive application to autonomously export datasets of the expansive application to a spreadsheet managed by the spreadsheet application engine 320. For example, when the integration engine 316 receives a request to integrate datasets of an expansive application from an application engine, the integration engine 316 is configured to import the datasets of the expansive application and integrate the imported datasets to the spreadsheet.

As is understood by skilled artisans in the relevant computer and Internet-related arts, each functional component (e.g., engine, module, or database) illustrated in FIG. 3 may be implemented using hardware (e.g., a processor of a machine) or a combination of logic (e.g., executable software instructions) and hardware (e.g., memory and processor of a machine) for executing the logic. Furthermore, the various functional components depicted in FIG. 3 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple engines. Specific hardware structure of the functional components illustrated in FIG. 3 is exemplified with reference to FIG. 5.

Figure 4A:
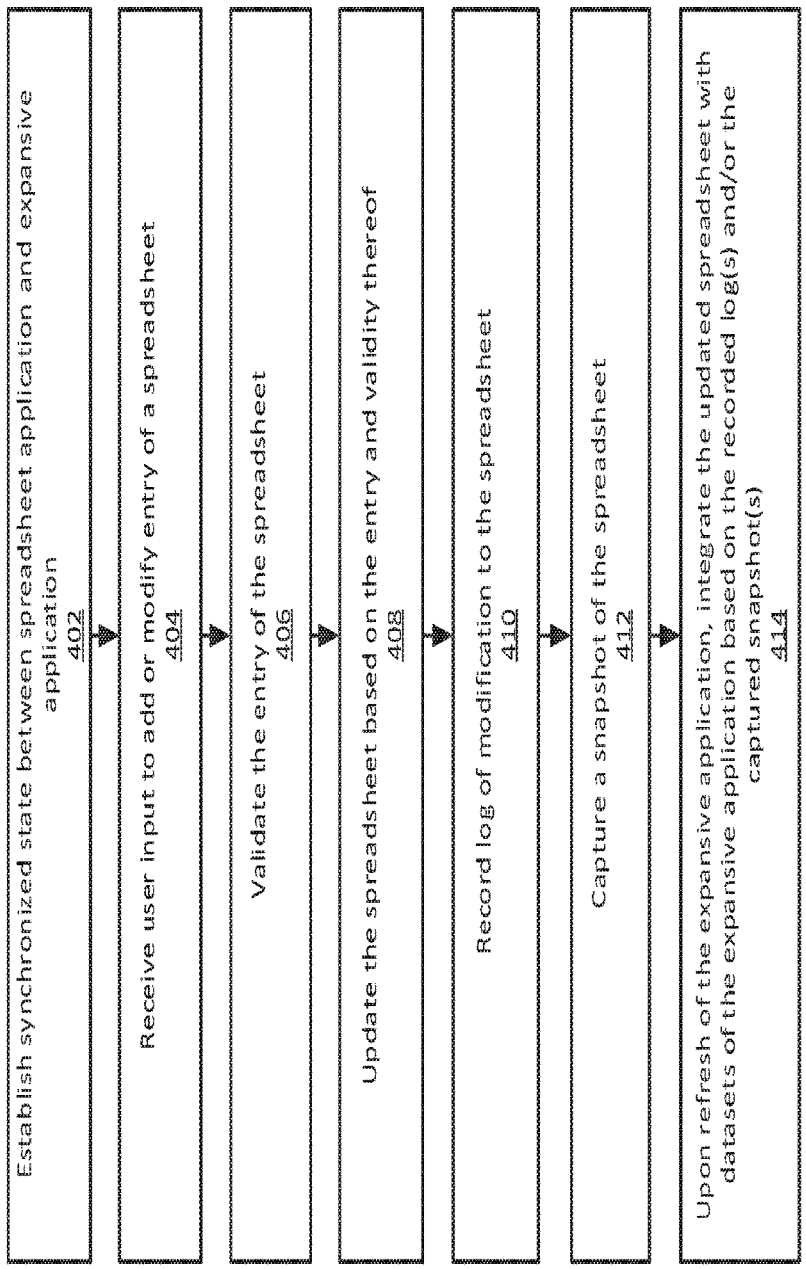
FIGS. 4A and 4B are flowcharts of examples of a method for integrating update of a spreadsheet generated on a spreadsheet application into datasets managed on an expansive application according to some embodiments.

FIG. 4A is a flowchart 400A of an example of a method for integrating update of a spreadsheet generated on a spreadsheet application into datasets managed on an expansive application according to some embodiments. This flowchart described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In module 402 of FIG. 4A, a synchronized state is established between a spreadsheet application and an expansive application. Applicable engines for executing an spreadsheet application and an expansive application, such as the spreadsheet application engine 120 and the application engine 106 in FIG. 1, respectively, executes the spreadsheet application and the expansive application; and an applicable engine for establishing a synchronized state, such as the integration engine 216 in FIG. 3 stablishes the synchronized state. In a specific implementation, when the synchronized state is established, a change made to a spreadsheet managed by the spreadsheet application is synchronized to datasets managed by the expansive application, and vice versa.

In module 404 of FIG. 4A, user input to add or modify an entry (e.g., one or more cells in a row) of a spreadsheet is received. An applicable engine for receiving user input such as the interface engine 302 in FIG. 3 receives the user input to add or modify an entry of a spreadsheet. In a specific implementation, a UI to add or modify an entry of a spreadsheet is generated for the user input. In another specific implementation, a drag and drop operation is enabled such that an object (or metadata thereof, link, and/or thumbnail) can be directly inserted into a cell of the spreadsheet.

In module 406 of FIG. 4A, the entry of the spreadsheet is validated according to validation rules. An applicable engine for managing validation rules, such as the rule management engine 304 in FIG. 3, manages the validation rules, and an applicable engine for validating an entry of a spreadsheet, such as the validation engine 306 in FIG. 3, validates the entry of the spreadsheet. In a specific implementation, it is determined whether or not the entry caused a cell with an invalid value according to the validation rules.

In module 408 of FIG. 4A, the spreadsheet is updated based on the entry received in module 404 and the validity of the entry determined in module 406. An applicable engine for updating a spreadsheet based on an entry, such as the interface engine 302 in FIG. 3, updates the spreadsheet based on the entry and the determined validity of the entry. In a specific implementation, when a drag and drop operation of a file is carried out with respect to a cell of the spreadsheet, a link or a thumbnail representing the file is presented in the cell of the spreadsheet. In another specific implementation, when it is determined that the entry caused a cell with an invalid value in module 406, the cell with the invalid value is caused to be visually distinguished (e.g., highlight) compared to the of remainder of cells included in the spreadsheet.

In module 410 of FIG. 4A, a log of modification to the spreadsheet caused by the entry received in module 404 is recorded in a repository for maintaining logs. An applicable engine for recording a log, such as the log management engine 310 in FIG. 3, records the log of the modification to the spreadsheet. In a specific implementation, a log includes one or more of an identifier (e.g., user name, user ID, etc.) of a user who made a change, content of the change, a cell at which the change was made, a time and date of the change.

In module 412 of FIG. 4A, a snapshot of the spreadsheet is captured. An applicable engine for capturing a snapshot of a spreadsheet, such as the history management engine 308 in FIG. 3, captures the snapshot of the spreadsheet. In a specific implementation, capture of the snapshot is triggered by the update of the spreadsheet in module 408. In another specific implementation, capture of the snapshot is triggered at a predetermined timing. In some embodiments, a sequence of process from module 404 through module 412 is carried out repeatedly, so that more than one logs of modification to the spreadsheet and more than one snapshots of the spreadsheet are generated and stored.

In module 414 of FIG. 4A, upon refresh of the expansive application, the updated spreadsheet is integrated with datasets of the expansive application based on the recorded log(s) and/or the captured snapshot(s). An applicable engine for integrating an updated spreadsheet with datasets of an expansive application, such as the integration engine 316 in FIG. 3, integrates the updated spreadsheet with the datasets of the expansive application, based on the recorded log(s) and/or the captured snapshot(s). In a specific implementation, when multiple snapshots are generated since the last integration of the spreadsheet, the most recent snapshot is used for the integration, and the other snapshot(s) are disregarded. In another specific implementation, one or more logs that have been generated for the spreadsheet are integrated with the datasets of the expansive application, which is a database analysis application, such that the database analysis application performs analysis of the datasets based on the logs of the modifications to the spreadsheet.

Figure 4B:
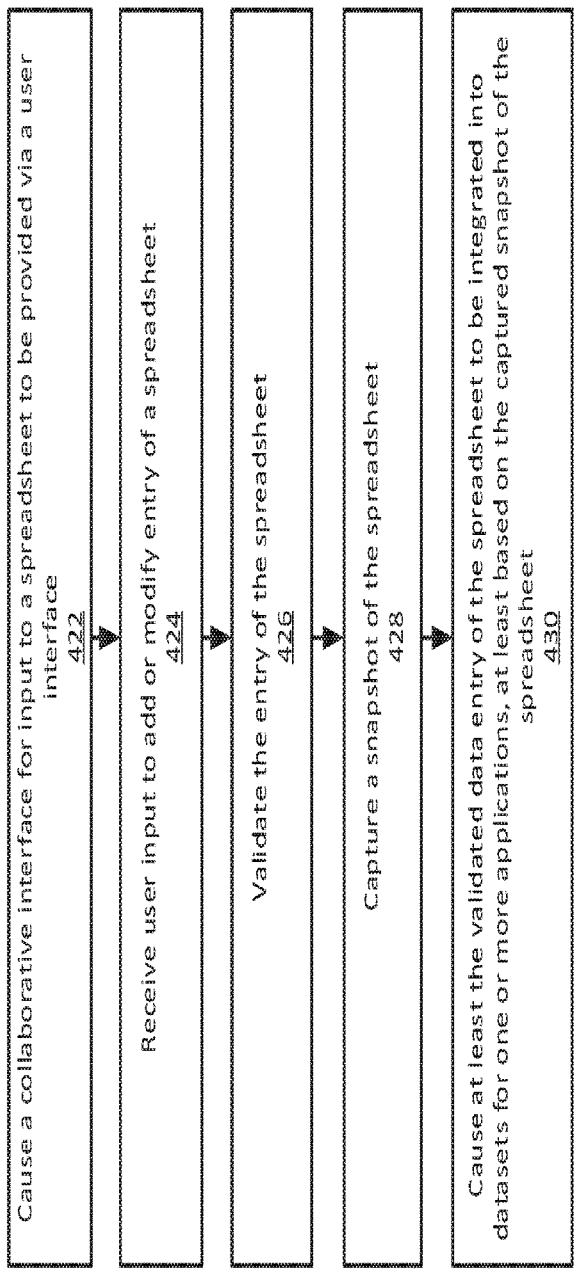

FIG. 4B is a flowchart 400B of another example of the method for integrating update of a spreadsheet generated on a spreadsheet application into datasets managed on an expansive application according to some embodiments.

In module 422 of FIG. 4B, a collaborative interface for input to a spreadsheet is caused to be provided via a user interface. An applicable engine for causing a collaborative interface for input to a spreadsheet to be provided via a user interface, such as the interface engine 302 in FIG. 3, causes the collaborative interface for input to the spreadsheet to be provided via the user interface.

In module 424 of FIG. 4B, user input to add or modify an entry (e.g., one or more cells in a row) of a spreadsheet is received. In module 426 of FIG. 4B, the entry of the spreadsheet is validated according to validation rules. In module 428 of FIG. 4B, a snapshot of the spreadsheet is captured. In some embodiments, modules 424, 426, and 428 can be carried out in the same or similar manner as modules 404, 406, and 412 of FIG. 4A.

In module 430 of FIG. 4B, at least the validated data entry of the spreadsheet is caused to be integrated into datasets for one or more applications, at least based on the captured snapshot of the spreadsheet. An applicable engine for causing a validated data entry of a spreadsheet to be integrated into datasets for one or more applications, such as the integration engine 316 in FIG. 3, causes at least the validated data entry of the spreadsheet is caused to be integrated into datasets for one or more applications, at least based on the captured snapshot of the spreadsheet.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
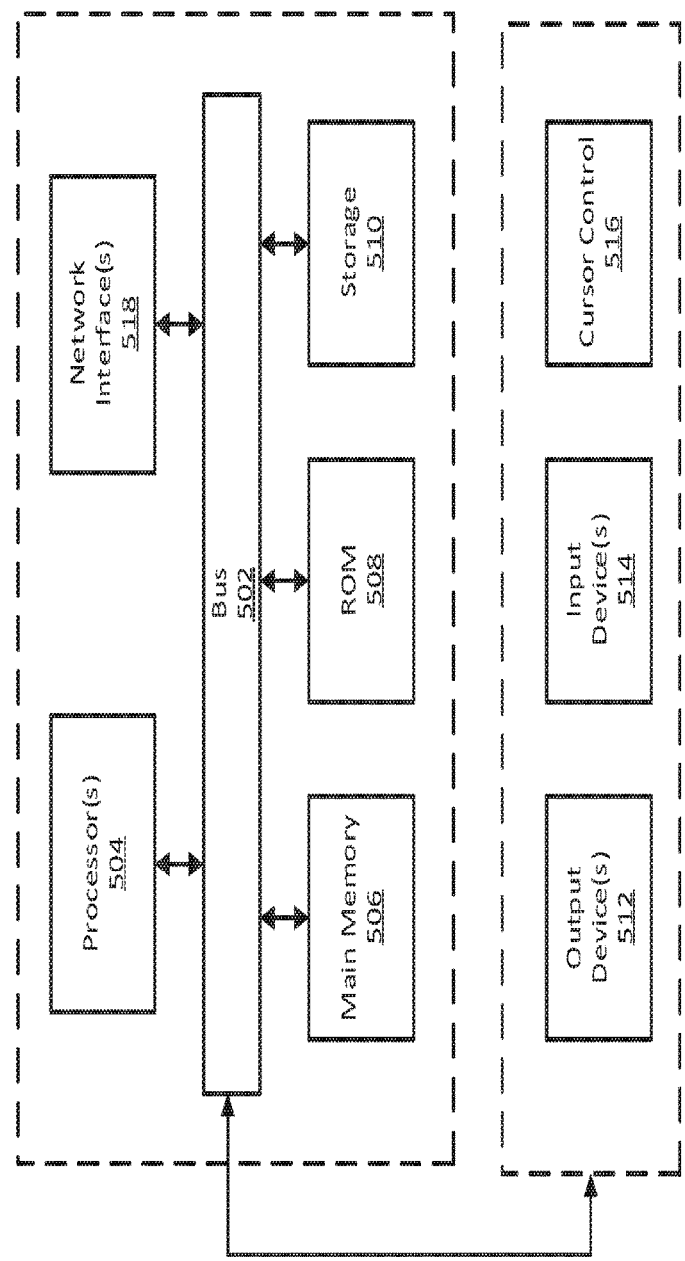
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information.

Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for collaborative data entry and integration, comprising:
    one or more processors; and
    memory storing instructions for a spreadsheet application that, when executed by the one or more processors, cause the system to:
    receive a first spreadsheet, the first spreadsheet comprising column names and first validation rules;
    generate a template from a region within the first spreadsheet based on a schema of the first spreadsheet;
    in response to receiving an edit into the template, the edit comprising an input or data, create a second spreadsheet that comprises data, and one or more second validation rules assigning specific constraints to at least a portion of specific cells of the second spreadsheet;
    integrate the second spreadsheet into an application, the integrating comprising:
    comparing the one or more second validation rules with an application data schema of the application, the application data schema comprising one or more particular constraints, the application including a particular application type;
    based on the comparing, identifying any first cells that are associated with one or more first specific constraints of the one or more second validation rules, wherein the one or more first specific constraints include each of the one or more particular constraints of the application data schema;
    based on the comparing, identifying any second cells from which at least one of the one or more particular constraints of the application data schema are not included in any associated second specific constraints, of the one or more second validation rules, corresponding to the any second cells;
    in response to the comparing, integrating, into data for the application, first data corresponding to the first cells of the second spreadsheet while refraining from integrating second data corresponding to the second cells of the second spreadsheet.

2. The system of claim 1, wherein the integration of the second spreadsheet into the application comprises capturing a most recent snapshot, the capturing being implemented at a variable frequency that depends on a duration of time since the most recent snapshot was first captured.

3. The system of claim 1, wherein the instructions further cause the system to:
    receive changes at the second spreadsheet; and
    generate a log of the changes at the second spreadsheet, the log comprising respective cells, times, and dates of the changes.

4. The system of claim 3, wherein the instructions further cause the system to:
    integrate the log of changes into the application.

5. The system of claim 3, wherein the instructions further cause the system to:
    synchronize the changes with the data for the application.

6. The system of claim 5, wherein the synchronization comprises:
    receiving an indication that an entry has been added or modified in the second spreadsheet; and
    validating the added or modified entry according to the one or more second validation rules.

7. The system of claim 3, wherein the receiving of the changes comprises permitting an insertion of an object, metadata, and a link directly into a cell of the second spreadsheet.

8. A method comprising:
    receive a first spreadsheet, the first spreadsheet comprising column names and first validation rules;

generate a template from a region within the first spreadsheet based on a schema of the first spreadsheet;

in response to receiving an edit into the template, the edit comprising an input or data, create a second spreadsheet that comprises data, and one or more second validation rules assigning specific constraints to at least a portion of specific cells of the second spreadsheet;

integrate the second spreadsheet into an application, the integrating comprising:

comparing the one or more second validation rules with an application data schema of the application, the application data schema comprising one or more particular constraints, the application including a particular application type;

based on the comparing, identifying any first cells that are associated with one or more first specific constraints of the one or more second validation rules, wherein the one or more first specific constraints include each of the one or more particular constraints of the application data schema;

based on the comparing, identifying any second cells from which at least one of the one or more particular constraints of the application data schema are not included in any associated second specific constraints, of the one or more second validation rules, corresponding to the any second cells;

in response to the comparing, integrating, into data for the application, first data corresponding to the first cells of the second spreadsheet while refraining from integrating second data corresponding to the second cells of the second spreadsheet.

9. The method of claim 8, wherein the integration of the second spreadsheet into the application comprises capturing a most recent snapshot, the capturing being implemented at a variable frequency that depends on a duration of time since the most recent snapshot was first captured.

10. The method of claim 8, further comprising:
receiving changes at the second spreadsheet; and
generating a log of the changes at the second spreadsheet, the log comprising respective cells, times, and dates of the changes.

11. The method of claim 10, further comprising:
integrating the log of changes into the application.

12. The method of claim 10, further comprising:
synchronizing the changes with the data for the application.

13. The method of claim 12, wherein the synchronization comprises:
receiving an indication that an entry has been added or modified in the second spreadsheet; and
validating the added or modified entry according to the one or more second validation rules.

14. The method of claim 10, wherein the receiving of the changes comprises permitting an insertion of an object, metadata, and a link directly into a cell of the second spreadsheet.

15. A non-transitory computer readable medium comprising instructions that, when executed, cause the one or more processors to perform:
receive a first spreadsheet, the first spreadsheet comprising column names and first validation rules;
generate a template from a region within the first spreadsheet based on a schema of the first spreadsheet;

in response to receiving an edit into the template, the edit comprising an input or data, create a second spreadsheet that comprises data, and one or more second validation rules assigning specific constraints to at least a portion of specific cells of the second spreadsheet;

integrate the second spreadsheet into an application, the integrating comprising:

comparing the one or more second validation rules with an application data schema of the application, the application data schema comprising one or more particular constraints, the application including a particular application type;

based on the comparing, identifying any first cells that are associated with one or more first specific constraints of the one or more second validation rules, wherein the one or more first specific constraints include each of the one or more particular constraints of the application data schema;

based on the comparing, identifying any second cells from which at least one of the one or more particular constraints of the application data schema are not included in any associated second specific constraints, of the one or more second validation rules, corresponding to the any second cells;

in response to the comparing, integrating, into data for the application, first data corresponding to the first cells of the second spreadsheet while refraining from integrating second data corresponding to the second cells of the second spreadsheet.

16. The non-transitory computer readable medium of claim 15, wherein the integration of the second spreadsheet into the application comprises capturing a most recent snapshot, the capturing being implemented at a variable frequency that depends on a duration of time since the most recent snapshot was first captured.

17. The non-transitory computer readable medium of claim 15, wherein the instructions that, when executed, cause one or more processors to perform:
receiving changes at the second spreadsheet; and
generating a log of the changes at the second spreadsheet, the log comprising respective cells, times, and dates of the changes.

18. The non-transitory computer readable medium of claim 17, wherein the instructions that, when executed, cause one or more processors to perform:
integrating the log of changes into the application.

19. The non-transitory computer readable medium of claim 17, wherein the instructions that, when executed, cause one or more processors to perform:
synchronizing the changes with the data for the application.

20. The non-transitory computer readable medium of claim 19, wherein the synchronization comprises:
receiving an indication that an entry has been added or modified in the second spreadsheet; and
validating the added or modified entry according to the one or more second validation rules.

* * * * *